United States Patent [19]

Valley et al.

[11] Patent Number: 4,773,739
[45] Date of Patent: Sep. 27, 1988

[54] SELF-PUMPED PHASE CONJUGATE MIRROR AND METHOD USING AC-FIELD ENHANCED PHOTOREFRACTIVE EFFECT

[75] Inventors: George C. Valley, Los Angeles; Marvin B. Klein, Malibu, both of Calif.

[73] Assignee: Hughes Aircraft Company, Los Angeles, Calif.

[21] Appl. No.: 836,679

[22] Filed: Mar. 5, 1986

[51] Int. Cl.$^4$ .......................... G02B 5/23; G02F 1/01; G02F 1/03; G03H 1/02
[52] U.S. Cl. .................................. 350/354; 350/355; 350/393; 350/3.62; 350/356; 372/99
[58] Field of Search ................ 307/425; 350/354, 356, 350/393, 3.62; 372/99

[56] References Cited

U.S. PATENT DOCUMENTS

| 4,500,855 | 2/1985 | Feinberg | 307/425 |
| 4,527,132 | 7/1985 | Huignard | 332/7.51 |
| 4,529,273 | 7/1985 | Cronin-Golomb et al. | 350/354 |

OTHER PUBLICATIONS

C. Giuliano, Physics Today, "Applications of Optical Phase Conjugation", Apr. 1981, pp. 1–8.
J. Feinberg, Optics Letters, vol. 7, No. 10, Oct. 1982, "Self-pumped, Continuous-wave Phase Conjugator Using Internal Reflection".
White, et al., Appl. Physics Lett. 40, pp. 450–452 (1982), "Coherent Oscillation by Self-induced Gratings in the Photorefractive Crystal."
A. Yariv, "Introduction to Optical Electronics, 2d. ed.", pp. 246–253 (1976).
Stepanov et al., "Efficient Unstationary Holographic Recording in Photorefractive Crystals Under an External Alternating Electric Field", Optics Communications, 53(5), pp. 292–295, Apr. 1985.
Petrov et al., "New Mechanisms of Holographic Recording and Wavefront Conjugation in Cubic Photorefractive Crystals", ICO-13 Conference Digest, 1984, pp. 430–431.
Stepanov et al., "Efficient Phase Conjugation in the Photorefractive Crystal Bi$_{12}$TiO$_{20}$", Sov. Tech. Phys. Lett., 10(11), pp. 572–573, Nov. 1984.

Cronin–Golomb et al., "Laser With Dynamic Holographic Intracavity Distortion Correction Capability", Appl. Phys. Lett., 41(3), pp. 219–220, Aug. 1982.
Cronin et al., "Passive (self-pumped) Phase Conjugate Mirror: Theoretical and Experimental Investigation", Applied Physics Letters, vol. 41, No. 8, Oct. 1982, N.Y., USA, pp. 689–691.
Stefanov et al., "Efficient Unstationary Holographic Recording Photo Refractive Crystals and External Alternating Electric Field", Optics Communications, vol. 53, No. 5, Apr. 1985, pp. 292–295.
White et al., "Coherent Oscillation by Self-induced Gratings in the Photorefractive Crystal BaTiO$_3$", Applied Physics Letters, vol. 40 (1982), Mar., No. 6, New York, USA, pp. 450–452.

(List continued on next page.)

Primary Examiner—Eugene R. Laroche
Assistant Examiner—Michael B. Shingleton
Attorney, Agent, or Firm—V. D. Duraiswamy; A. W. Karambelas

[57] ABSTRACT

A self-pumped phase conjugate mirror and method is disclosed in which an optical beam is applied to a crystal formed from a photorefractive material, the beam is deflected back into the crystal as a return beam to cross-couple with the input probe beam, and an alternating electric field is applied across the crystal to establish a photorefractive index grating shift of about 90° and bring the crystal gain up to a level at which phase conjugation takes place. By a suitable selection of field strength and frequency, and an angle between the probe and return beams within the crystal of less than about 5° (3° for GaAs), semiconductor materials with electro-optic coefficients of less than about 10 picometers/volt can be used as the conjugating medium. Such materials have previously not worked in a self-pumped conjugator, but are much more readily available, more responsive, and have improved bandwidths compared to substantially higher electro-optic coefficient refractive materials that have been used in prior inherently self-pumped conjugators.

12 Claims, 2 Drawing Sheets

OTHER PUBLICATIONS

Feinberg, "Self-pumped Continuous-wave Phase Conjugator Using Internal Reflection", Optics Letters, vol. 7, No. 10, Oct. 1982, pp. 486-488.

Anderson et al., "Self-pumped Phase Conjugation in $BaTiO_3$ at 1.06 $\mu$m", Optics Letters, vol. 10, No. 12, Dec. 1985, New York, USA, pp. 627-628.

Cronin et al., "Infrared Photorefractive Passive Phase Conjugation with $BaTiO_3$: Demonstrations with GaAlAs and 1.09 $\mu$m Ar+ lasers", Applied Physics Letters, vol. 47, No. 6, Sep. 1985, New York, USA, pp. 567-569.

J. P. Huignard, "Materiaux non Lineaires a Variation d'indice photoinduite et Applications", Journal of Optics, vol. 15, No. 5, Sep.-Oct. 1984, Paris, FR, pp. 305-315.

Rajbenbach et al., "Self-induced Coherent Oscillations with Photorefractive $Bi_{12}SiO_{20}$ Amplifier", Optics Letters, vol. 10, No. 3, Mar. 1985, pp. 137-139.

Huignard et al., "Coherent Signal Beam Amplification in Two-Wave Mixing Experiments with Photorefractive $Bi_{12}SiO_{20}$ Crystals", Optics Communications, vol. 38, No. 4, Aug. 1981, (Amsterdam, NL), pp. 249-254.

Ph. Refrgier, "Two-beam Coupling in Photorefractive $Bi_{12}SiO_{20}$ Crystals with Moving Grating: Theory and Experiments", J. of Applied Physics 58 (1), Jul. 1985, pp. 45 thru 57.

J. P. Huignard, "Nonlinear Materials with Photoinduced Index Change and Applications," Optical Horizons, 1034 Journal of Optics, 15 (1984), Sep.-Oct., No. 5, Paris, France, pp. 305-313, (English Translation).

SELF-PUMPED PHASE CONJUGATE MIRROR AND METHOD USING AC-FIELD ENHANCED PHOTOREFRACTIVE EFFECT

BACKGROUND OF THE INVENTION

1. Field of the Invention

This invention relates to apparatus and methods for forming a phase conjugate mirror, and more particularly to phase conjugate mirrors employing a photorefractive material as the conjugating medium.

2. Description of the Prior Art

Phase conjugation is an optical phenomenon that has attracted considerable attention in recent years. Several different ways of producing phase conjugated beams have been discussed in the literature, including four-wave mixing, stimulated Brillouin scattering, Raman scattering, three-wave mixing and photon echo devices. A review of various applications of optical phase conjugation is presented by Giuliano in Physics Today, "Application of Optical Phase Conjugation", April 1981, pages 27–35. A general review of the field is given in A. Yariv, IEEE, J. Quantum Electronics QE14, 650 (1978), and R. Fisher, "Optical Phase Conjugation", Academic Press, N.Y., 1983.

Basically, a phase conjugate mirror PCM produces a retro-reflective reflection of an incident beam, with the sign of the phase of the reflected beam reversed from that of the incident beam at the point of reflection. A typical PCM known in the prior art is shown in FIG. 1. This is illustrated as a four-wave mixer, in which a pair of contradirectional laser beams 2 and 4 are directed into an optical mixing medium 6. A probe laser beam $E_I$, equal in frequency to beams 2 and 4, is directed into the mixing medium from the side. As a result of the action of the various beams within the mixing medium, a reflected beam $RE_I^*$, where R is the coefficient of reflectivity, is reflected back in a direction opposite to incident beam $E_I$. Since power is pumped into the system by beams 2 and 4, the reflector may produce an amplification which makes R greater than 1. In addition to being retro-reflective to the incident beam, the phase conjugated reflected beam also undergoes a phase reversal with respect to the incident beam at the point of reflection.

PCMs can be provided either with external pumping beams, as in the four-wave mixer illustrated in FIG. 1, or as a "self-pumped" device, the advantage of the self-pumped variety residing in the elimination of the requirement for external pump beams. Of the self-pumped PCMs, those employing Brillouin or Raman scattering are generally employed in connection with high power pulsed laser beams, such as from a Nd:YAG laser, but do not work with low power lasers such as HeNe. Another type of self-pumped PCM is based upon the use of a photorefractive material with a large electro-optic coefficient as the phase conjugating medium.

It will be helpful at this point to briefly discuss the characteristics which distinguish photorefractive materials. In general, a photorefractive material is one in which the index of refraction changes under the influence of applied light, such as a laser beam. The light causes charges within the photorefractive material to migrate and separate, producing an internal electrostatic field. This field produces a change in the crystal's refractive index by the linear electro-optic effect (the Pockels effect). The photorefractive "index grating", or periodic variation in the crystal's index of refraction, is a measure of the change in the index.

The formation of a photorefractive index grating is illustrated in FIG. 2, in which the horizontal axis represents distance along the normal to the grating formed by the interference of two beams within the photorefractive crystal. The upper graph illustrates the pattern of light with a spatially periodic intensity I within the crystal, while the next graph illustrates the resulting charge density $\rho$ within the crystal. The mobile charges, illustrated as being of positive polarity, tend to accumulate in the dark regions of the light intensity pattern. The resulting periodic charge distribution produces a periodic electrostatic field E by Poisson's equation. This electric field, illustrated in the third graph of FIG. 2, then causes a change in the refractive index $\Delta N$ of the crystal by the linear electro-optic effect. This photorefractive effect, illustrated in the last graph of FIG. 2, is non-local in that the maximum refractive index change does not occur at the peak of the light intensity. In FIG. 2 the spatial shift between $\Delta N$ and I is $\frac{1}{4}$ of the grating period, corresponding to a 90° phase shift.

Typical photorefractive materials are $LiNbO_3$, $KNbO_3$, $BaTiO_3$, SBN, $Bi_{12}SiO_{20}$, $Bi_{12}TiO_{20}$, $Bi_{12}GeO_{20}$, GaAs and InP. Other materials with a non-zero electro-optic coefficient and a large donor-trap population are expected to be photorefractive. Only a small number of photorefractive materials, with electro-optic coefficients substantially greater than 10 picometers/volt, have been found to be capable of producing an inherently self-pumped PCM. Photorefractive materials with electro-optic coefficients in the order of 10 picometers/volt or less have been found to exhibit insufficient gain to support a self-pumped operation.

Self-pumped PCMs using $BaTiO_3$ (barium titanate) and $Sn_{1-x}Ba_xNb_2O_6$ (strontium barium niobate) have previously been demonstrated (White et al., Appl. Phys. Lett. 40, p. 450, (1982); Feinberg, Opt. Lett. 7, 486, (1982)). The theory of the electro-optic effect is described in a text by A. Yariv, "Introduction to Optical Electronics, 2d ed.", pp. 246–53 (1976). The largest electro-optic coefficient is $BaTiO_3$ is 1640 pm/V. These materials, however, have several drawbacks. They are difficult to obtain in good optical quality and large sizes, operate in relatively small temperature ranges ($BaTiO_3$ has a destructive phase transition at 5° C.), have a relatively slow responsive time, and are not sensitive at all wavelengths of interest. One wavelength range to which these materials are not particularly sensitive, but which is very important for several commercial applications, is the range of about 0.7 microns to about 11 microns; commercial applications within this range include optical data processing, beam combining, adaptive optics, photolithography and others.

Several years after publication of the White et al. and Feinberg papers, a series of papers were published by Stepanov and Petrov in which the use of photorefractive materials for both phase conjugation and holography was discussed (Optics Communications 53, 292, Apr. 1, 1985; Proc. of ICO-13, Sapporo 1984; Sov. Tech. Phys. Lett. 10 (11), November 1984). These papers developed the concept of applying an alternating electric field to a photorefractive material to increase its two-wave mixing gain coefficient for holographic and image processing applications. This was suggested as an improvement over prior uses of photorefractive materials for holography and image processing, in which a DC electric field had been employed to increase the gain of the material. Stepanov and Petrov thus reported improved results from an alternating field but, in the very same papers in which they disclosed the use of an alternating field for two-wave holography, they suggested a continuation of the four-wave external pumping arrangement for phase conjugation. No suggestion was made for the realization of a self-pumped PCM.

SUMMARY OF THE INVENTION

In view of the above problems associated with the prior art, it is an object of this invention to provide an apparatus and method for optical phase conjugation which is self-pumped, is capable of operating at relatively low continuous wave laser beam intensities, can use readily available materials, and has a shorter response time and greater sensitivity in commercially important wavelength ranges than prior self-pumped photorefractive PCMs.

Another object is the achievement of such a phase conjugation system and method using photorefractive materials having a substantially lower electro-optic coefficient than photorefractive materials used in self-pumped conjugators, down to the range of 10 pm/V and below.

In the accomplishment of these and other objects of the invention, a self-pumped phase conjugation system and method is disclosed in which an enhanced photorefractive index grating with a shift of about 90° is established within a photorefractive crystal by applying an alternating electric field of sufficient magnitude and frequency across the crystal. An input probe laser beam transmitted through the crystal is deflected back at a defined angle to the probe beam within the crystal, the angle being sufficiently small to obtain sufficient gain to induce a phase conjugate output of the probe beam. This technique makes it possible to use much more plentiful and inexpensive semiconductor materials such as GaAs (gallium arsenide), and other materials such as $Bi_{12}(Si,Ge,Ti)O_{20}$ that have electro-optic coefficients less than 10 pm/V.

The period of the alternating electric field is greater than the recombination time, but less than the grating formation time, of the crystal material. Successful self-pumped operation is achieved with relatively low electro-optic coefficient materials with readily attainable field strengths and frequency ranges. The conjugator requires no external pumps, operates with significantly lower light intensities than either Brillouin or Raman devices, and can employ materials that are much easier to obtain and have faster responses and greater sensitivity ranges than the high electro-optic coefficient photorefractive materials that are inherently self-pumping without an applied electric field.

These and other objects and features of the invention will be apparent to those skilled in the art from the following description of preferred embodiments, taken together with the accompanying drawings, in which:

DETAILED DESCRIPTION OF PREFERRED EMBODIMENTS

Figure 1:
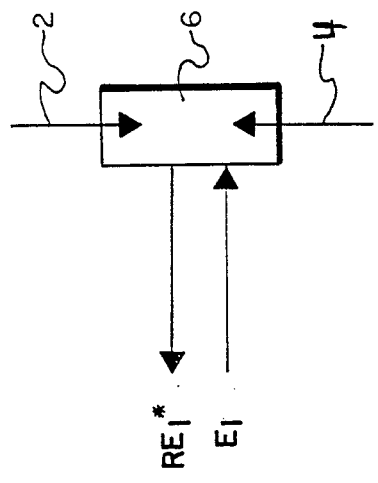
FIG. 1 is an illustrative diagram of a prior art PCM employing four-wave mixing.
Figure 3:
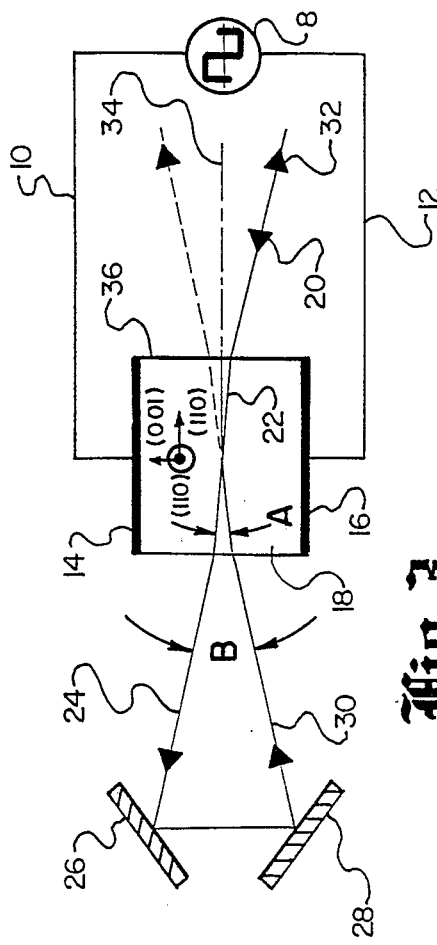
FIG. 3 is a block diagram showing a PCM constructed in accordance with the invention.
Figure 2:
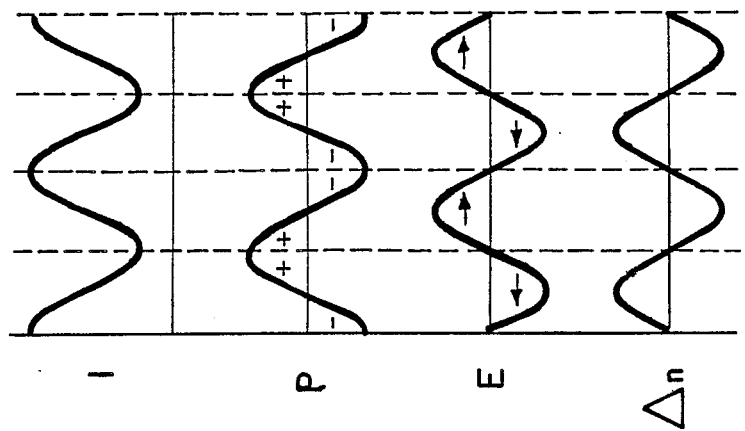
FIG. 2 is a series of graphs illustrating the formation of a photorefractive index grating in a photorefractive medium.

FIG. 3 illustrates a desirable implementation of the invention. An alternating voltage source 8 is connected by lead wires 10 and 12 to electrodes 14 and 16 placed on opposite faces of a crystal 18, shaped in cubic form, which is formed from a photorefractive material. The crystal orientation as it is cut is as indicated in the drawing, with the vertical axis (0 0 1), the horizontal axis (1 1 0) and the z axis emerging from the paper (1 1 0). Electrodes 14 and 16 are preferably formed from films of conductive material painted or deposited onto the opposite faces of the photorefractive crystal. An input probe laser beam 20 is directed towards the crystal, and is refracted onto a path 22 within the crystal. The beam is again refracted back to its original direction when it emerges from the opposite side of the crystal as an output beam 24. This output beam is deflected by a pair of turning mirrors 26,28 back through the crystal as a return beam 30. The turning mirrors 26,28 could be implemented as a single corner mirror if the angle between output beam 24 and return beam 30 is small enough, or they could be replaced by some other beam deflection device such as a curved optical fiber.

The mirror apparatus directs the return beam 30 so that it intersects the probe beam 22 within the crystal at an angle A. The two beams cross-couple with each other, transferring energy from return beam 30 and forming a phase conjugate of the probe beam, the phase conjugated beam 32 emerging from the crystal along a path which is substantially retro-reflective to the original probe beam 20. This cross-coupling to produce a phase conjugate beam has previously been observed, as described in the background section, only in photorefractive materials having high electro-optic coefficients, such as barium titanate. However, the application of an alternating electric field to the crystal has been found to result in a similar phase conjugation effect even for photorefractive materials having electro-optic coefficients that are normally too low to permit inherent self-pumping. This technique produces a refractive index grating shift of 90° within the crystal and an enchancement in the magnitude of the space charge field, which are believed to be a necessary condition for phase conjugation.

It should be noted that, if an axis 34 is drawn perpendicular to the crystal face 36 upon which the probe beam 20 is incident, the angles between this axis and both the probe and return beams are substantially equal. While other orientations could be used, this one produces the greatest gain and strongest conjugated beam for most photorefractive media. With other materials (such as barium titanate) with large values of off-diagonal components of the electro-optic tensor, maximum beam coupling may be achieved by tilting the axis with respect to the crystal face.

At the present time the production of the phase conjugation effect in this particular geometry is not fully understood. An explanation currently held is that light is scattered during both transits through the crystal, and that the scattered light on the phase conjugate retro-reflective path is amplified more than the other light.

Whatever the exact nature of the effect, however, it has been discovered that the application of an alternating electric field can extend the effect to a greater range of photorefractive materials, yielding more useful systems with a wider degree of applications, that was previously attainable.

Self-pumped photorefractive conjugators were previously restricted to ferroelectric materials such as BaTiO$_3$, which were useful for continuous wave lasers but had poor availability, fairly small crystals, a relatively slow response time and poor sensitivity to important wavelengths such as 0.7-11 microns. The extension of the self-pumped capability to insulators such as Bi$_{12}$SiO$_{20}$, Bi$_{12}$TiO$_{20}$, and Bi$_{12}$GeO$_{20}$, and to semiconductors such as GaAs, InP and CdTe, by the addition of a suitable alternating electric field in accordance with the invention, overcomes these limitations of the prior art.

It has been calculated that the optical gain coefficient of the photorefractive material under the influence of the alternating electric field can be on the order of about 10 cm$^{-1}$ or more; this exceeds the gain coefficient necessary to obtain phase conjugation in BaTiO$_3$. In practice, the minimum necessary gain varies with factors such as the properties of the material and the geometry of the conjugation process. Normally, this is expected to lie within the range of about 5-25 cm$^{-1}$. The factors which primarily determine the gain of the photorefractive material are the type of material used, the number of empty traps and electro-optic coefficient of this material, the magnitude and frequency of the applied electric field, and the angle between the probe and return beams. This angle can be expressed either as the angle A between the beams within the crystal, or the greater angle B between the beams outside the crystal, the difference being accounted for by refraction (see FIG. 3). For example, optimum angles for inherently self-pumping barium titanate are in the order of 30° outside the crystal and 12° inside, while optimum angles for non-inherently self-pumping gallium arsenide are less than 10° outside and less than 3° inside the crystal.

Figure 4:
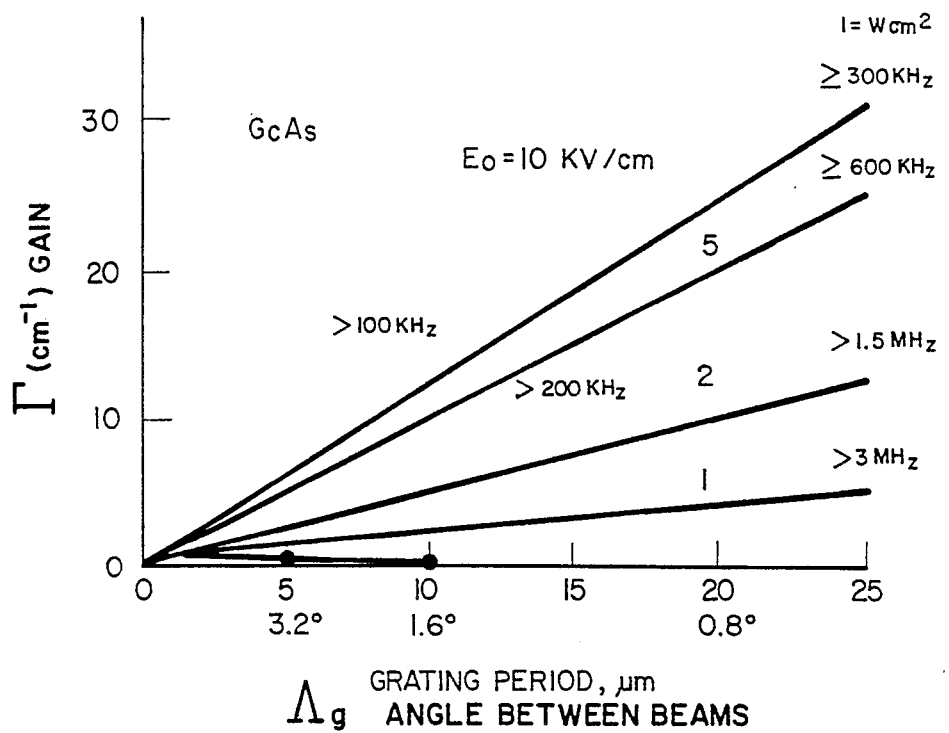
FIG. 4 is a graph relating the calculated gain of GaAs as a self-pumped conjugating medium to the magnitude and frequency of an applied alternating electric field, and to the angular coupling between the probe and return beams within the medium.

A graph relating calculated beam angle, field strength and field frequency to gain is provided in FIG. 4 for gallium arsenide, which is a particularly useful semiconductor that because of the invention for the first time can be employed in a self-pumped phase conjugation system. The horizontal axis represents the angle and grating period between the beams, these two factors being inverse to each other, while the vertical axis represents the optical gain coefficient. Plots are given for field strengths of 1, 2, 5 and 10 kV/cm at an input intensity of 1 watt/cm$^2$. It can be seen that the gain generally increases with increasing field intensity and frequency, but decreases as the internal angle between the beams goes up. Best operation is achieved with an internal beam angle less than about 3° for gallium arsenide, and in general for semiconductor materials it is believed that the internal beam angle should be less than about 5°. This is considerably less than the optimum beam angles associated with ferroelectric materials, such as barium titanate, that have inherent self-pumping properties.

Semiconductors in general have a much faster response times than ferroelectric materials, giving the phase conjugation system a greater range of applications. For example, the usefulness of slow response ferroelectric materials in atmospheric applications is limited because it is possible for air turbulence and the aberrations it causes to change before the crystal can respond and produce a conjugated retro-reflective beam. With faster response semiconductor materials, by contrast, the conjugated beam will normally be transmitted back along the propagation path before the air turbulence has had time to change. While the importance of photorefractive materials for relatively low power, continuous wave beams has been stressed, it should also be understood that the use of semiconductive materials has the potential for operation at higher power regimes because larger crystals can be obtained than with prior ferroelectric materials such as barium titanate. The semiconductors also have a greater bandwidth; the commercial importance of their ability to operate in the 0.7-11 micron range has already been mentioned. However, since the semiconductor materials in general have much lower electro-optic coefficients than inherently self-pumping ferroelectric materials like barium titanate, practical self-pumped conjugators using semiconductors as the conjugating medium have simply not been available heretofore.

Figure 5:
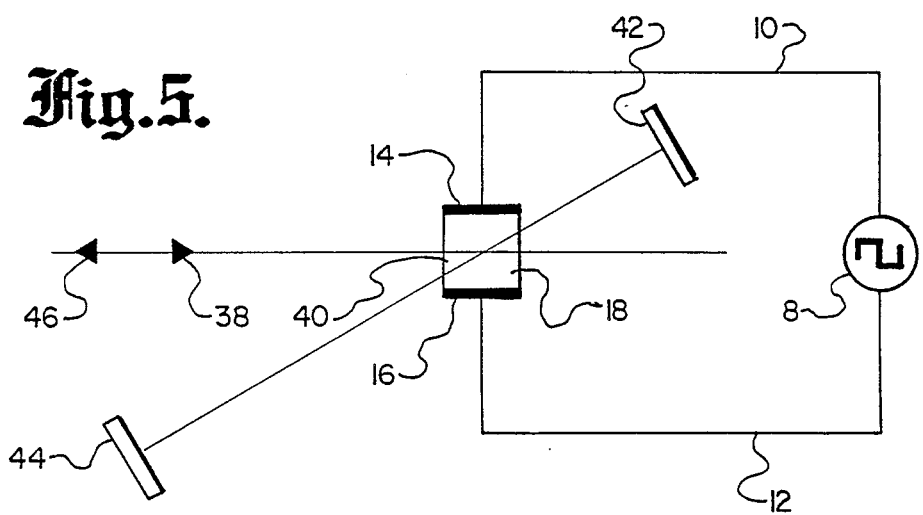
FIG. 5 is a block diagram of an alternate physical arrangement for implementing the invention.

Another physical setup which is known in the prior art and can be applied to the present invention is illustrated in FIG. 5, in which the same reference numerals are used as in FIG. 3 to identify common elements. In this embodiment an input laser beam 38 is directed perpendicular to face 40 of photorefractive crystal 18. Scattering and fanning of the input beam due to discontinuities in the crystal results in an optical resonance through the crystal between opposed mirrors 42 and 44, which are positioned on opposite sides of the crystal and offset from the probe beam axis. The two mirrors are stationed along a path at which the scattered and fanned input beam light is preferentially amplified. A retro-reflective phase conjugate beam 46 is induced as a result of the coupling within the crystal between the probe beam and the geam resonating between the mirrors. Again, the application of an alternating electric field to the crystal via alternating voltage source 8 and electrodes 14,16 provides an enhanced gain characteristic which makes it possible to use semiconductor materials for the crystal, and to achieve the attendant advantages of such materials.

While separate mirrors are shown in the embodiments of FIGS. 3 and 5 for deflecting the probe beam back into the crystal to cross-couple with the original beam, some conjugators obtain reflection off the crystal itself without the use of external mirrors. The function of the mirrors could be implemented as a reflective coating on the crystal, and in some cases an inherent reflection is obtained off the crystal surface. For purposes of the invention, such mechanisms for deflecting the probe beam back through the crystal are equivalent to the use of separate mirrors.

Various embodiments of a self-pumped phase conjugate mirror and associated method which employ photorefractive materials as the conjugating medium have thus been shown and described. As numerous variations and alternate embodiments will occur to those skilled in the art, it is intended that the invention be limited only in terms of the appended claims.

We claim:

1. A self-pumped phase conjugate mirror (PCM), comprising:
   a crystal formed from a photorefractive material with an electro-optic coefficient not high enough to inherently sustain self-pumped phase conjugation, said crystal adapted to receive an optical probe beam, means for applying an alternating electric field to the crystal of sufficient magnitude and frequency to establish a photorefractive index grating shift of about 90° within the crystal, the period of the alternating electric field being greater than the recombination time but less than the grating formation time of said photorefractive material, and external beam deflection means adapted to deflect a probe beam back through said crystal at a return angle to the probe beam within the crystal which is sufficiently small to enhance the space charge field within said crystal to a level at which self-pumped phase conjugation is maintainable.

2. The self-pumped PCM of claim 1, said photorefractive material having an electro-optic coefficient of less than about 10 picometers/volt.

3. The self-pumped PCM of claim 1, said photorefractive material comprising a semiconductor.

4. The self-pumped PCM of claim 3, said beam deflection means deflecting the return beam back through the crystal at an angle to the probe beam within the crystal of less than about 5°.

5. The self-pumped PCM of claim 1, said crystal material being photorefractively sensitive to electromagnetic radiation in the range of about 0.7 microns–11 microns.

6. A self-pumped conjugate mirror (PCM), comprising:
a body formed from a photorefractive material with an electro-optic coefficient not high enough to inherently sustain self-pumped phase conjugation, said photorefractive material adapted to receive an optical probe beam, means for applying an alternating electric field to the body having a period greater than the recombination time but less than the grating formation time of said photorefractive material, and external beam deflection means adapted to deflect a laser beam which has been transmitted through said body at an angle to the probe beam within the body of less than about 5° to induce a phase conjugate of the probe beam without external pump beams.

7. The self-pumped PCM of claim 6, said photorefractive material comprising a semiconductor.

8. A method of forming a phase conjugate of a probe optical beam comprising:
forming a body of phtorefractive material having an electro-optic coefficient not high enough to inherently support self-pumped phase conjugation;

directing the beam through the body of photorefractive material in a first direction, applying an alternating electric field to the body of photorefractive material of sufficient magnitude and frequency to establish a photorefractive index grating shift of about 90° within the body of photorefractive material and period greater than the recombination time but less than the grating formation time of the photorefractive material, and directing the beam back through the body in a second direction which is at a sufficiently small acute angle to the first direction within the body so as to enhance the space charge field within the body and induce a phase conjugate of the probe beam.

9. The method of claim 8, the probe optical beam comprising a continuous wave laser beam.

10. The method of claim 8, said photorefractive material comprising a semiconductor, wherein the beam is directed back through the body at an angle of less than about 5° to the first direction.

11. The method of claim 10, wherein the beam is directed back though the crystal at an angle to the probe beam within the crystal of less than about 3°.

12. A self-pumped phase conjugate mirror (PCM), comprising:
a body formed from a photorefractive semiconductor material having a low electro-optic coefficient not sufficient to inherently support self-pumped phase conjugation, and adapted to receive an optical probe beam, means for applying an alternating electric field to the body of magnitude and frequency sufficient for establishing a photorefractive index grating shift of about 90° and enhancing the space charge within the body so as to make the body capable of supporting self-pumped phase conjugation, and external beam deflection means, adapted to deflect the probe beam which has been transmitted through the body at a return angle to the probe beam of less than about 5° to induce a phase conjugate of the probe beam without external pump beams.

* * * * *